Nov. 22, 1949 W. C. ARZT 2,488,892
JUNIOR MOTORCYCLE
Filed March 18, 1947 2 Sheets-Sheet 1
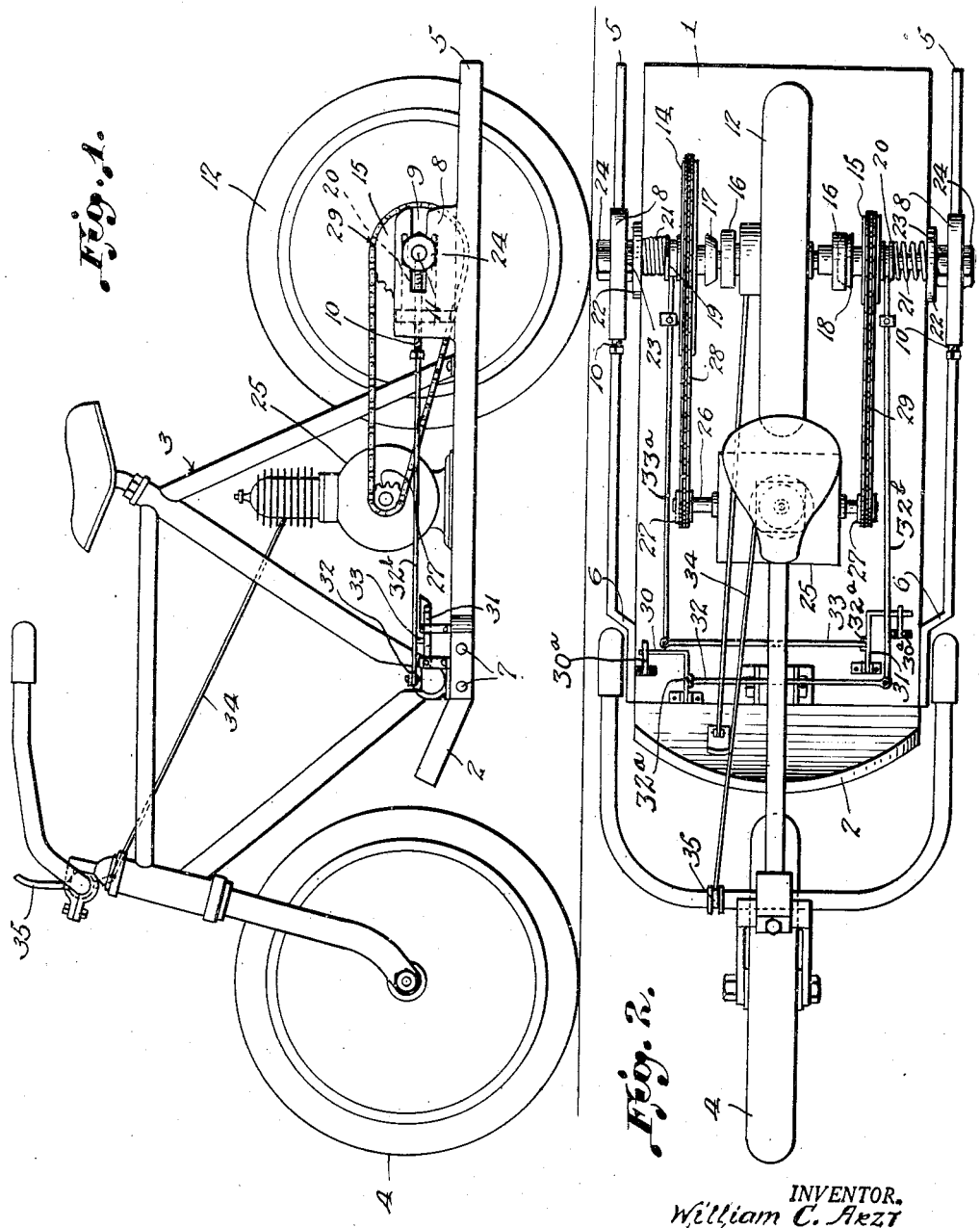
INVENTOR.
William C. Arzt
BY
E. E. Vrooman & Co.
Attorneys.

Nov. 22, 1949  W. C. ARZT  2,488,892
JUNIOR MOTORCYCLE
Filed March 18, 1947  2 Sheets-Sheet 2
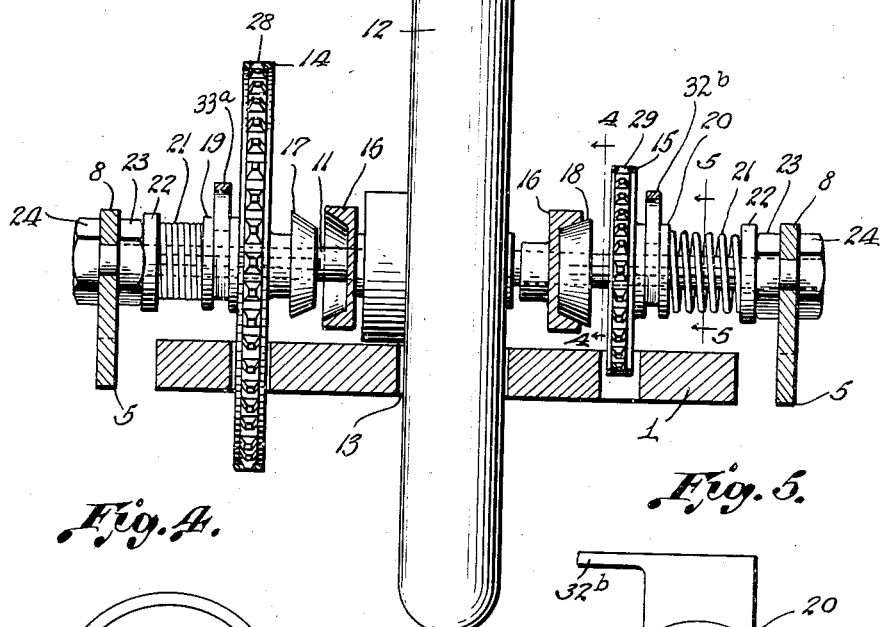
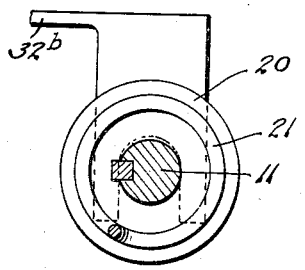
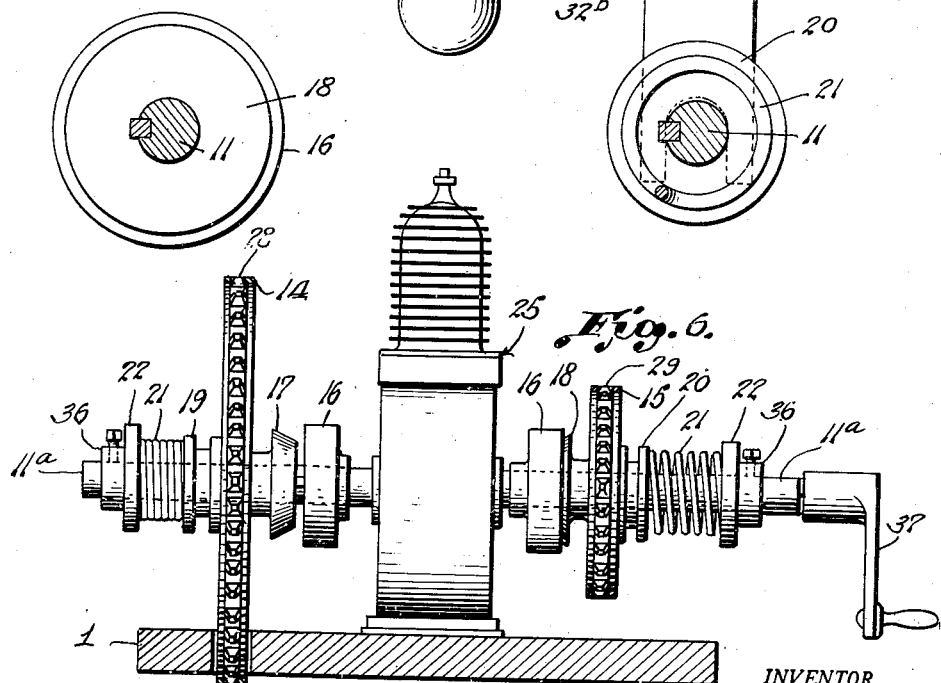
INVENTOR,
William C. Arzt
BY
E. E. Vrooman & Co.,
Attorneys.

Patented Nov. 22, 1949

2,488,892

UNITED STATES PATENT OFFICE 2,488,892

JUNIOR MOTORCYCLE

William C. Arzt, Bedford, Va.

Application March 18, 1947, Serial No. 735,339

2 Claims. (Cl. 74—217)

This invention relates to a junior motor cycle.

An object of the invention is the construction of a motor cycle in which the chain drive extends from the centrally located motor to the rear or primary shaft, constituting the axle of the rear wheel.

Another object of the invention is the construction of a comparatively simple and efficient junior motor cycle.

A still further object of the invention is the construction of a junior motor cycle in which a platform is employed to permit the operator to rest his feet upon, as well as efficient and novel side-sections on said platform, whereby the rear or primary wheel-carrying shaft is efficiently supported.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 1 is a view in side elevation of a junior motor cycle constructed in accordance with the present invention, while Fig. 2 is a top plan view of the same.

Fig. 3 is a transverse view, showing parts in end elevation and parts in transverse section.

Fig. 4 is an enlarged sectional view taken on line 4—4, Fig. 3, and looking in the direction of the arrows.

Fig. 5 is a transverse sectional view taken on line 5—5, Fig. 3, and looking in the direction of the arrows.

Fig. 6 is an end view in elevation of another embodiment, showing the platform in transverse section.

Referring to the drawings, in which the preferred embodiment of this invention is shown in Figs. 1 to 5, I designates a flat platform which is provided at its front end with an upwardly extending foot board 2. A cycle frame 3 of any desired construction is fastened preferably to the top of the platform 1. This cycle frame 3 includes the usual front wheel 4.

Two side-sections 5 are employed, each comprising an elongated strip of metal which has at its inner end a Z-shape portion 6; the Z-shape end is suitably fastened at 7, Fig. 1, to the side edge of platform 1. By this novel construction, the rear end of the side-section is slightly spaced from the platform 1 to give the required space between the two side-sections for accommodating the mechanism hereinafter described. Each side-section is also provided near its rear end with an upstanding integral bracket 8. Each upstanding bracket 8 is provided with a horizontal slot 9. This slot 9 is open at its outer end, Fig. 1. On the inner portion of each bracket 8 is a horizontal adjusting bolt 10. The inner end of the adjusting bolt 10 extends into the slot 9 and against the primary or wheel-carrying shaft 11. A rear pneumatic wheel 12 is fixedly secured to the primary shaft 11. This wheel 12 extends through a suitable elongated aperture 13 formed in the platform 1. A high-speed sprocket wheel 14 and a low-speed sprocket 15 are loosely mounted on the primary shaft 11. Two fixed clutch sections 16 are fixedly secured to the shaft 11. A male clutch member 17 is fixedly secured to the sprocket wheel 14 and a male clutch member 18 is fixedly secured to the sprocket wheel 15. A grooved collar 19 is fixedly secured to the sprocket wheel 14, and a grooved collar 20 is fixedly secured to the sprocket wheel 15. Two coil springs 21 are on the primary shaft and bear at their inner ends against the grooved collars 19 and 20. The outer ends of springs 21 bear against washers 22. Outside of washers 22 and on shaft 11 are nuts 23 which are engaged by the upwardly extending brackets 8. On the outer ends of the primary shaft 11 are nuts 24. These nuts 23 and 24 securely fasten the primary shaft 11 on the side-sections 5, against accidental lateral displacement, while the adjusting bolts 10 hold the shaft against accidental longitudinal movement of the motor cycle.

A motor 25 is mounted on the platform 1. Motor or auxiliary shaft 26 is connected to motor 25 and is driven thereby; this shaft projects from opposite sides of the motor 25. Suitable small sprockets 27 are fixedly secured to shaft 26 and on these sprockets 27 are sprocket chains 28 and 29. When the motor is in operation the sprocket wheels 14 and 15 will be rotated through the medium of the sprocket chains, etc.

Foot pedal 30 may be held down by a latch 30a. This pedal 20 has a cam surface 32a that slidably engages the end of rod 32. Rod 32 is pivotally connected to the outer end of rod 32b, which rod 32b engages the grooved collar 20 to move it from meshing engagement with the clutch section 16. Pedal 31 also has a cam surface 32a that is engaged by rod 33. Rod 33 is pivotally connected to rod 33a, which operates grooved collar 19. By pressing downwardly upon the foot pedal 31 the high-speed clutch device will be held out of operation, in the position shown in Fig. 3. When the operator desires to throw the motor cycle into high speed, he removes the pressure on foot pedal 31, allowing the male clutch member 17 to enter the female clutch member 16. In Fig. 3, the low-speed clutch device is shown in operation.

A rod 34 is suitably connected to operating handle 35 and is also connected to the motor in any suitable manner, whereby the operator can control the operation of the motor.

In Fig. 6, I have shown an embodiment similar in most details to the preferred embodiment hereinbefore described. In this embodiment, the primary shaft 11a is on the motor 25 and is provided near its ends with set collars 36; shaft 11a is rotated by said motor 25. On one end of shaft 11a there is means for receiving a crank 37, which crank enables operator to start the motor.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a junior motorcycle, the combination with two brackets, of a primary shaft extending through said brackets, driving means for rotating said primary shaft, two sets of clutch means on said primary shaft at opposite sides of said driving means, each set of said clutch means comprising a sprocket wheel, said sprocket wheel provided with an integral grooved collar, a coil spring on said primary shaft with its inner end against said grooved collar, a washer on said primary shaft and against the outer end of said coil spring, a nut on said primary shaft against said washer and said bracket, and a nut on the end of said primary shaft and against the outer face of said bracket.

2. In a junior motorcycle, the combination with two brackets, of a primary shaft extending through said brackets, driving means for rotating said primary shaft, two sets of clutch means on said primary shaft at opposite sides of said driving means, each set of said clutch means comprising a sprocket wheel, said sprocket wheel provided with an integral grooved collar, a coil spring on said primary shaft with its inner end against said grooved collar, a washer on said primary shaft and against the outer end of said coil spring, and means on said primary shaft against said washer for normally preventing outward movement of said washer on said primary shaft.

WILLIAM C. ARZT.

REFERENCES CITED

The following references are of record in the file of this patent:

UNITED STATES PATENTS

| Number | Name | Date |
|---|---|---|
| 501,454 | Wright | July 11, 1893 |
| 510,502 | Erb | Dec. 12, 1893 |
| 525,030 | Schweers et al. | Aug. 28, 1894 |
| 583,809 | Libbey | June 1, 1897 |
| 678,963 | Manson | July 23, 1901 |
| 1,113,308 | Cobb | Oct. 13, 1914 |
| 1,152,821 | Kurtz | Sept. 7, 1915 |
| 2,060,583 | Lewis | Nov. 10, 1936 |
| 2,243,124 | Rockola | May 27, 1941 |
| 2,331,976 | Hare | Oct. 19, 1943 |
| 2,339,182 | McDonald | Jan. 11, 1944 |